(12) United States Patent
Usami et al.

(10) Patent No.: US 11,448,332 B2
(45) Date of Patent: Sep. 20, 2022

(54) CHIP, MIXING DEVICE, AND MIXING METHOD

(71) Applicant: FUJIFILM Corporation, Tokyo (JP)

(72) Inventors: Yoshihisa Usami, Kanagawa (JP); Yasuyuki Ishii, Kanagawa (JP); Yuki Inoue, Kanagawa (JP); Aya Ouchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/035,220

(22) Filed: Sep. 28, 2020

(65) Prior Publication Data

US 2021/0010606 A1 Jan. 14, 2021

Related U.S. Application Data

(63) Continuation of application No. PCT/JP2018/040587, filed on Oct. 31, 2018.

(30) Foreign Application Priority Data

Mar. 30, 2018 (JP) .............................. JP2018-066536

(51) Int. Cl.
*F16K 17/38* (2006.01)
*B01F 25/00* (2022.01)
(Continued)

(52) U.S. Cl.
CPC ........ *F16K 17/383* (2013.01); *B01F 25/1051* (2022.01); *B01L 3/502738* (2013.01);
(Continued)

(58) Field of Classification Search
CPC ........... F16K 17/383; F16K 2099/0084; F16K 99/004; F16K 99/003; B01F 5/008;
(Continued)

(56) References Cited

U.S. PATENT DOCUMENTS

| 6,311,713 B1 * | 11/2001 | Kaartinen | ................ F16K 13/10 |
| | | | 137/13 |
| 7,980,272 B2 * | 7/2011 | Park | ..................... F16K 99/0032 |
| | | | 137/828 |

(Continued)

FOREIGN PATENT DOCUMENTS

| JP | 2001-165939 A | 6/2001 |
| JP | 2004-317325 A | 11/2004 |

(Continued)

OTHER PUBLICATIONS

Japanese Notice of Reasons for Refusal for corresponding Japanese Application No. 2020-509597, dated Jul. 6, 2021, with an English translation.

(Continued)

*Primary Examiner* — Minh Q Le
(74) *Attorney, Agent, or Firm* — Birch, Stewart, Kolasch & Birch, LLP

(57) ABSTRACT

A chip includes a first chamber that stores a fluid, a second chamber that stores a mixing target which is to be mixed with the fluid, a flow path that allows a communication between the first chamber and the second chamber, and a valve that is provided in the flow path and capable of changing the flow path by change in shape by heating.

17 Claims, 5 Drawing Sheets

(51) Int. Cl.
*F16K 99/00* (2006.01)
*G01N 35/08* (2006.01)
*B01L 7/00* (2006.01)
*G01N 37/00* (2006.01)
*B01L 3/00* (2006.01)

(52) U.S. Cl.
CPC ......... *B01L 7/52* (2013.01); *B01L 2300/0867* (2013.01); *B01L 2400/0457* (2013.01); *B01L 2400/0677* (2013.01); *F16K 99/003* (2013.01); *F16K 99/004* (2013.01); *F16K 2099/0084* (2013.01); *G01N 35/08* (2013.01); *G01N 37/00* (2013.01)

(58) Field of Classification Search
CPC ................ B01F 13/0059; B01F 15/021; B01F 25/1051; B01L 7/52; B01L 2300/0867; B01L 2400/0457; B01L 2400/0677; B01L 3/502738; G01N 35/08; G01N 37/00
USPC .......... 137/895, 72; 422/400, 417, 503, 537, 422/145, 290
See application file for complete search history.

(56) References Cited

U.S. PATENT DOCUMENTS

| | | | | |
|---|---|---|---|---|
| 7,998,433 | B2* | 8/2011 | Park | F16K 13/10 422/500 |
| 8,057,759 | B2* | 11/2011 | Lee | B01L 3/50273 422/509 |
| 8,235,073 | B2* | 8/2012 | Namkoong | F16K 99/004 137/828 |
| 9,995,411 | B1* | 6/2018 | Moorman | F16K 99/0036 |
| 2004/0007275 | A1* | 1/2004 | Hui Liu | B01L 3/502738 137/828 |
| 2006/0219308 | A1* | 10/2006 | Oh | F16K 99/0001 137/827 |
| 2007/0092409 | A1 | 4/2007 | Beatty et al. | |
| 2008/0042096 | A1* | 2/2008 | Park | B01L 3/502738 251/368 |
| 2008/0058192 | A1 | 3/2008 | Cho et al. | |
| 2008/0112855 | A1* | 5/2008 | Lee | B01L 3/502738 422/400 |
| 2008/0187474 | A1* | 8/2008 | Park | F16K 99/0019 422/292 |
| 2008/0274015 | A1* | 11/2008 | Park | F16K 99/004 422/72 |
| 2009/0252651 | A1* | 10/2009 | Park | B29C 66/242 422/400 |
| 2009/0286327 | A1* | 11/2009 | Cho | G01N 21/07 436/174 |
| 2010/0009457 | A1* | 1/2010 | Cho | B01F 15/0201 436/164 |
| 2010/0044918 | A1* | 2/2010 | Lee | B29C 39/006 264/297.8 |
| 2010/0093105 | A1* | 4/2010 | Lee | B32B 37/12 436/171 |
| 2010/0130732 | A1* | 5/2010 | Chung | G01N 33/53 536/25.41 |
| 2011/0121196 | A1* | 5/2011 | Yeo | F16K 99/004 250/428 |
| 2011/0136179 | A1* | 6/2011 | Bin/Lee | F16K 99/0059 435/91.2 |
| 2015/0028235 | A1 | 1/2015 | Ichiki et al. | |
| 2020/0030799 | A1* | 1/2020 | Baldi Coll | F16K 99/0032 |

FOREIGN PATENT DOCUMENTS

| | | |
|---|---|---|
| JP | 2007-278502 A | 10/2007 |
| JP | 2008-62232 A | 3/2008 |
| JP | 2009-250830 A | 10/2009 |
| WO | WO 2013/153912 A1 | 10/2013 |
| WO | WO 2016/136551 A1 | 9/2016 |

OTHER PUBLICATIONS

International Preliminary Report on Patentability and Written Opinion of the International Searching Authority, with an English translation (forms PCT/IB/373, PCT/ISA/237 and PCT/IB/326), dated Oct. 15, 2020, for corresponding International Application No. PCT/JP2018/040587.

International Search Report (form PCT/ISA/210), dated Jan. 29, 2019, for corresponding International Application No. PCT/JP2018/040587, with an English translation.

Japanese Notice of Reasons for Refusal for corresponding Japanese Application No. 2020-509597, dated Jan. 18, 2022, with an English translation.

* cited by examiner

CHIP, MIXING DEVICE, AND MIXING METHOD

CROSS-REFERENCE TO RELATED APPLICATIONS

This application is a continuation application of International Application No. PCT/JP2018/040587 filed Oct. 31, 2018, the disclosure of which is incorporated herein by reference in its entirety. Further, this application claims priority from Japanese Patent Application No. 2018-066536, filed Mar. 30, 2018, the disclosure of which is incorporated herein by reference in its entirety.

BACKGROUND

Technical Field

The technology of the present disclosure relates to a chip, a mixing device, and a mixing method.

Related Art

JP2004-317325A discloses a configuration in which a fluid is gelatinized by heating to close a branch flow path so that the fluid functions as a valve.

In the configuration of JP2004-317325A, since the fluid functions as a valve that closes the flow path, it was not possible to mix the fluid with a mixing target by opening the closed flow path by heating.

SUMMARY

In view of the above facts, an object of the technology of the present disclosure is to provide a chip, a mixing device, and a mixing method capable of mixing a fluid with a mixing target by opening a closed flow path by heating.

A chip according to a first aspect comprises a first chamber that stores a fluid, a second chamber that stores a mixing target which is to be mixed with the fluid, a flow path that allows a communication between the first chamber and the second chamber, and a valve that is provided in the flow path and capable of changing the flow path by change in shape by heating.

A mixing device according to a second aspect comprises: the chip according to the first aspect; and a heater that heats the valve.

A mixing method according to a third aspect comprises: a first step of heating a valve provided in a flow path that allows a communication between a first chamber and a second chamber, and changing a shape of the valve to open the flow path; and a second step of moving the fluid stored in the first chamber to the second chamber in which a mixing target is stored.

DETAILED DESCRIPTION

An example of an embodiment according to the present invention will be described below with reference to the drawings.

(Mixing Device 10)

Figure 1:
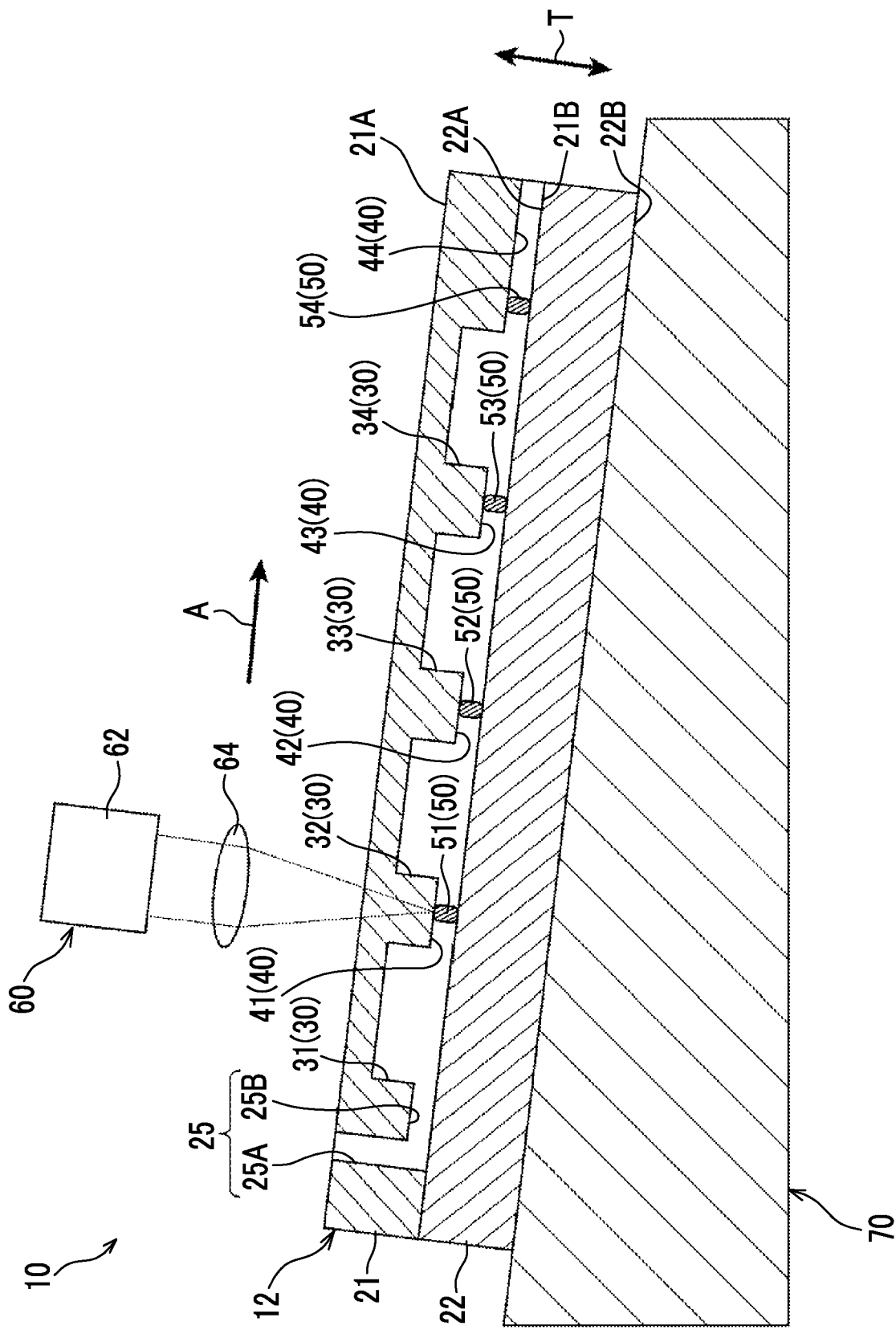
FIG. 1 is a cross-sectional view showing a schematic configuration of a mixing device according to the present embodiment.

A mixing device 10 according to the present embodiment will be described. FIG. 1 is a cross-sectional view showing a schematic configuration of the mixing device 10. A chip 12 shown in FIG. 1 is a chip 12 cut along the line 1-1 shown in FIG. 3.

The mixing device 10 shown in FIG. 1 is a device that mixes a fluid with a mixing target. Specifically, as shown in FIG. 1, the mixing device 10 includes the chip 12, an irradiation unit 60 (an example of a heater), and a moving mechanism 70. Hereinafter, a fluid and a mixing target, and a specific configuration of each part (the chip 12, the irradiation unit 60, and the moving mechanism 70) of the mixing device 10 will be described.

(Fluid and Mixing Target)

As the fluid, a fluid that can be mixed with the mixing target is used. Specifically, as the fluid, for example, a fluid that reacts with the mixing target or a fluid that contains a material that reacts with the mixing target is used. In addition, a liquid is used as the fluid, for example. As the liquid, for example, a specimen liquid containing a specimen is used. As the specimen liquid, for example, a liquid containing cells from which deoxyribonucleic acid (DNA) is released is used.

As the mixing target, a reaction agent that causes a reaction of the fluid is used. As the reaction agent, for example, a treatment agent that performs a specific treatment by causing a reaction of the fluid is used. As the treatment agent, for example, a surfactant or the like that releases DNA from cells contained in the specimen liquid is used.

(Chip 12)

Figure 2:
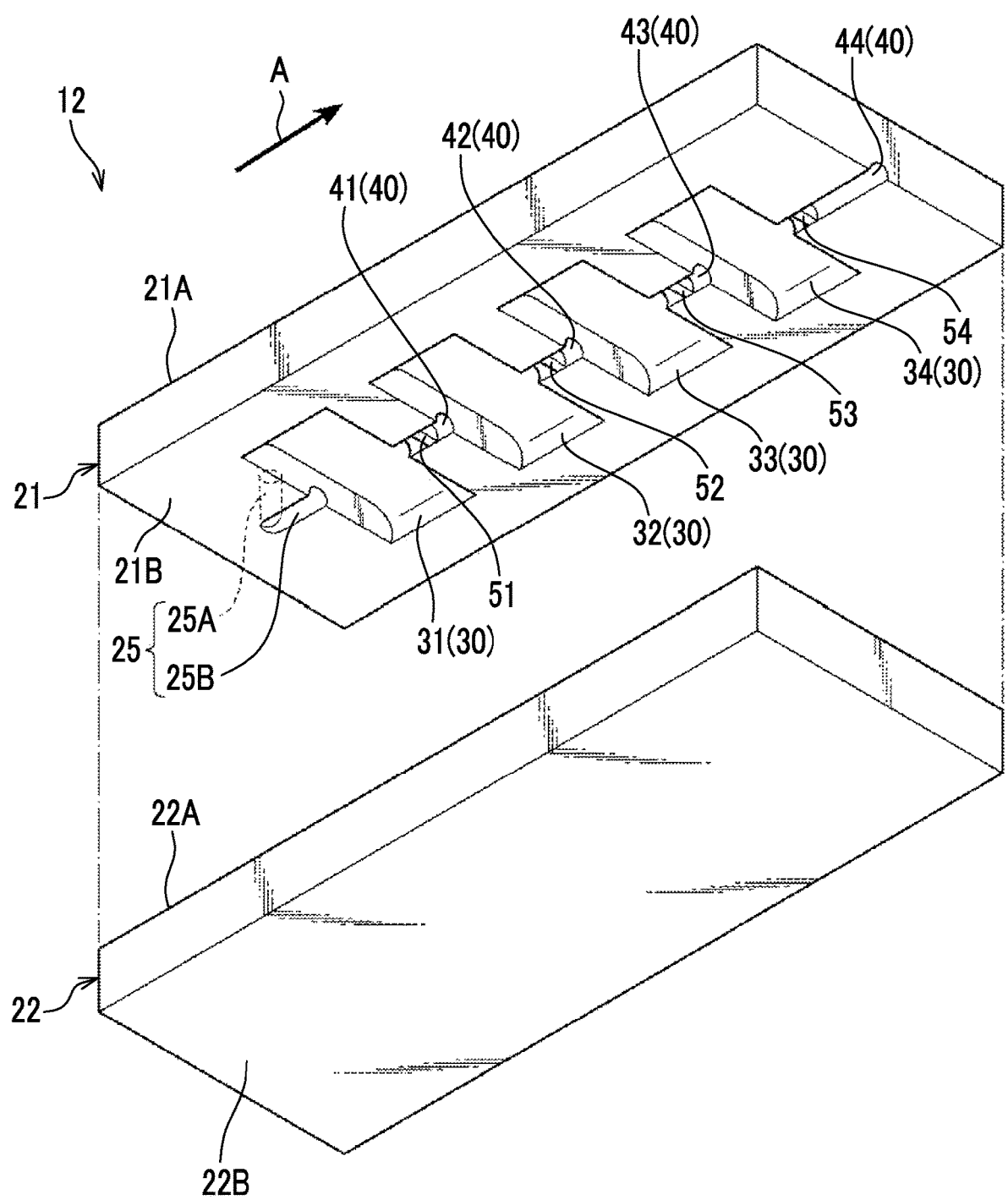
FIG. 2 is an exploded perspective view showing a schematic configuration of a chip according to the present embodiment.
Figure 3:
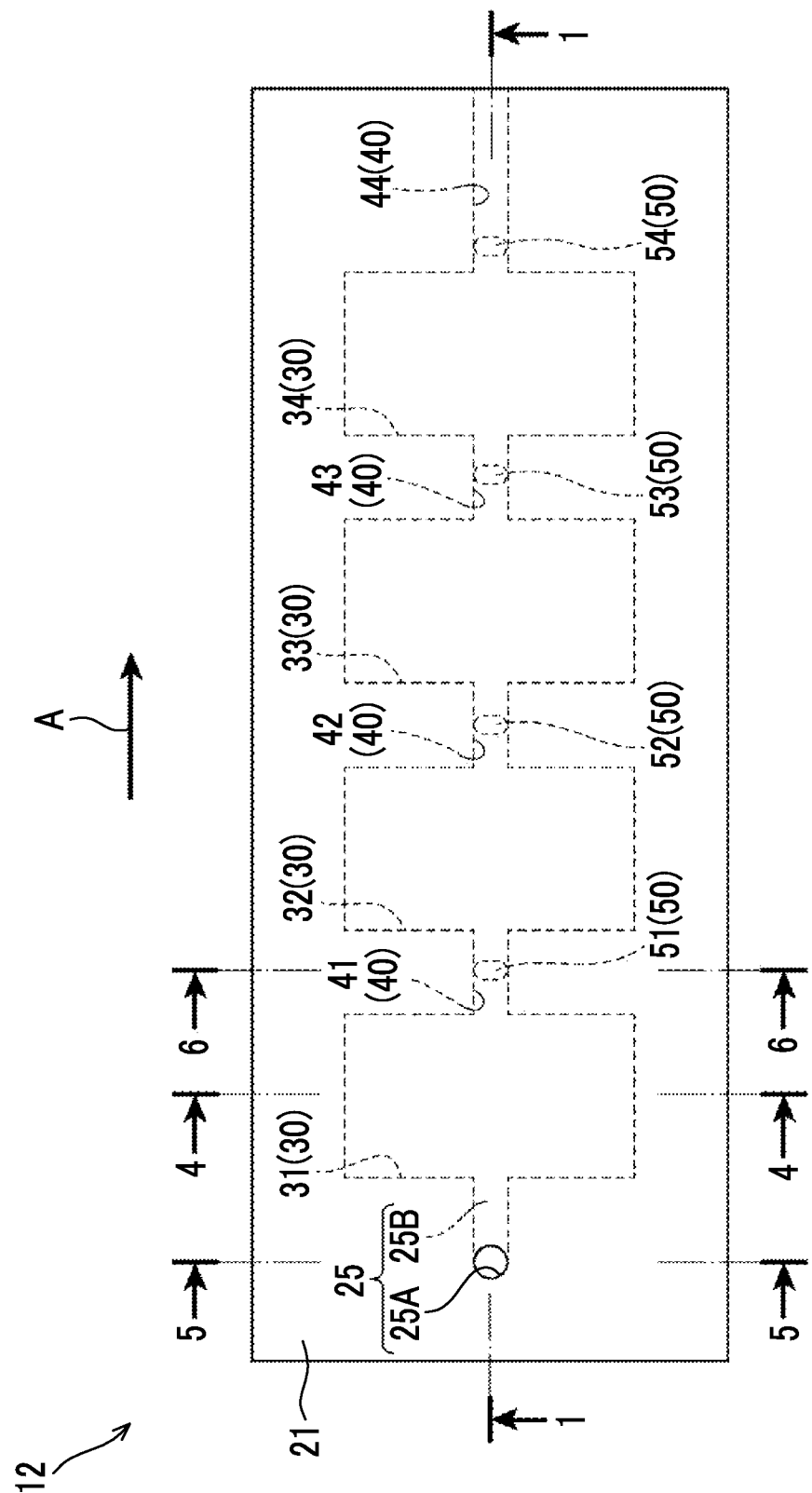
FIG. 3 is a plan view showing the schematic configuration of the chip according to the present embodiment.

FIG. 2 is an exploded perspective view showing a schematic configuration of the chip 12. FIG. 3 is a plan view showing a schematic configuration of the chip 12.

The chip 12 shown in FIG. 1, FIG. 2, and FIG. 3 is a storage body in which a liquid and a mixing target are stored and which mixes the liquid with the mixing target. Specifically, as shown in FIGS. 1, 2, and 3, the chip 12 includes a first substrate 21, a second substrate 22, a plurality of mixing chambers 30, an inflow path 25, a plurality of flow paths 40, and a plurality of valves 50. Hereinafter, a specific configuration of each part (the first substrate 21, the second substrate 22, the plurality of mixing chambers 30, the inflow path 25, the plurality of flow paths 40, and the plurality of valves 50) of the chip 12 will be described.

(First Substrate 21 and Second Substrate 22)

The first substrate 21 is an example of a light permeable member in which a flow path is formed and which is capable of transmitting light. Specifically, a transparent member is used as the first substrate 21. Examples of a material of the first substrate 21 include a resin material and glass.

On the other hand, the second substrate 22 does not need a function of transmitting light. Therefore, as the second substrate 22, for example, an opaque member is used. A transparent member may be used as the second substrate 22.

The first substrate 21 and the second substrate 22 are each formed in a rectangular plate shape as an example. The first substrate 21 has an upper surface 21A as a surface on one side in a thickness direction and a lower surface 21B as a surface on the other side in the thickness direction. The second substrate 22 has an upper surface 22A as a surface on one side in a thickness direction and a lower surface 22B as a surface on the other side in the thickness direction. Then, the lower surface 21B of the first substrate 21 is joined to the upper surface 22A of the second substrate 22. The thickness directions of the first substrate 21 and the second substrate 22 are a T direction in FIG. 1.

(Plurality of Mixing Chambers 30, Inflow Path 25, and Plurality of Flow Paths 40)

As the plurality of mixing chambers 30, four mixing chambers are provided in the chip 12. Specifically, as the plurality of mixing chambers 30, mixing chambers 31, 32, 33, and 34 (hereinafter, this may be referred to as mixing chambers 31 to 34) are provided in the chip 12. The mixing chamber 31 is an example of a first chamber that stores a fluid. In addition, the mixing chamber 32 is an example of a second chamber that stores a mixing target which is to be mixed with the fluid.

Figure 4:
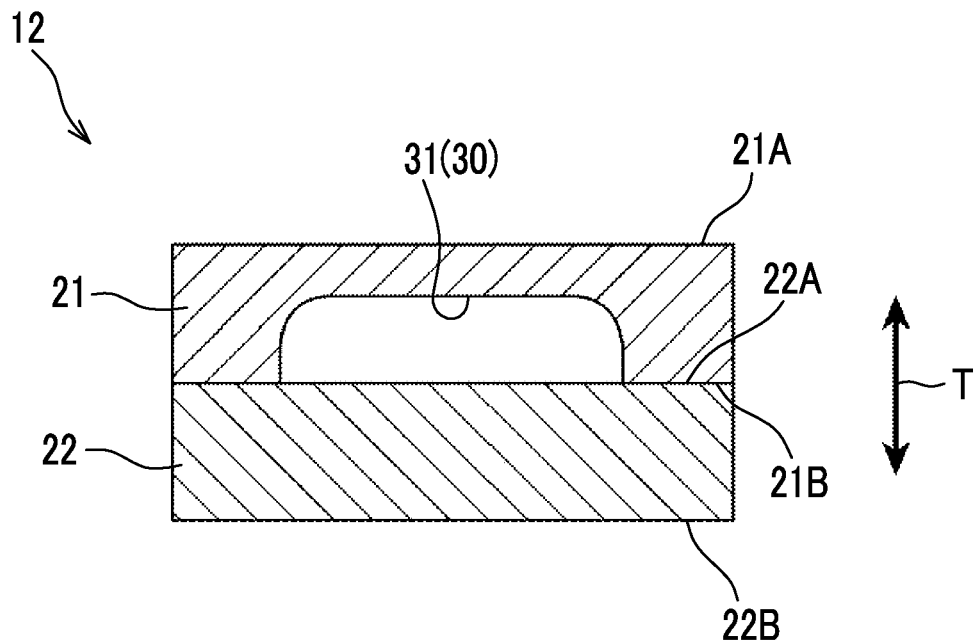
FIG. 4 is a cross-sectional view taken along line 4-4 in FIG. 3.

As shown in FIGS. 2 and 4, the mixing chambers 31 to 34 are each configured by a storage space formed in the first substrate 21 and capable of storing a fluid. The storage space is formed on the lower surface 21B of the first substrate 21 as described below. That is, a recess portion is formed in the lower surface 21B of the first substrate 21, and an opening on a lower side (second substrate 22 side) of the recess portion is closed by the upper surface 22A of the second substrate 22, whereby the storage space is formed. FIG. 4 is a cross-sectional view taken along line 4-4 in FIG. 3.

The mixing chambers 31, 32, 33, and 34 are arranged in this order along a direction (direction of an arrow A in FIGS. 1, 2, and 3) orthogonal to the thickness direction. Each of the mixing chambers 31, 32, 33, and 34 preliminarily stores a mixing target which is to be mixed with a fluid.

Figure 5:
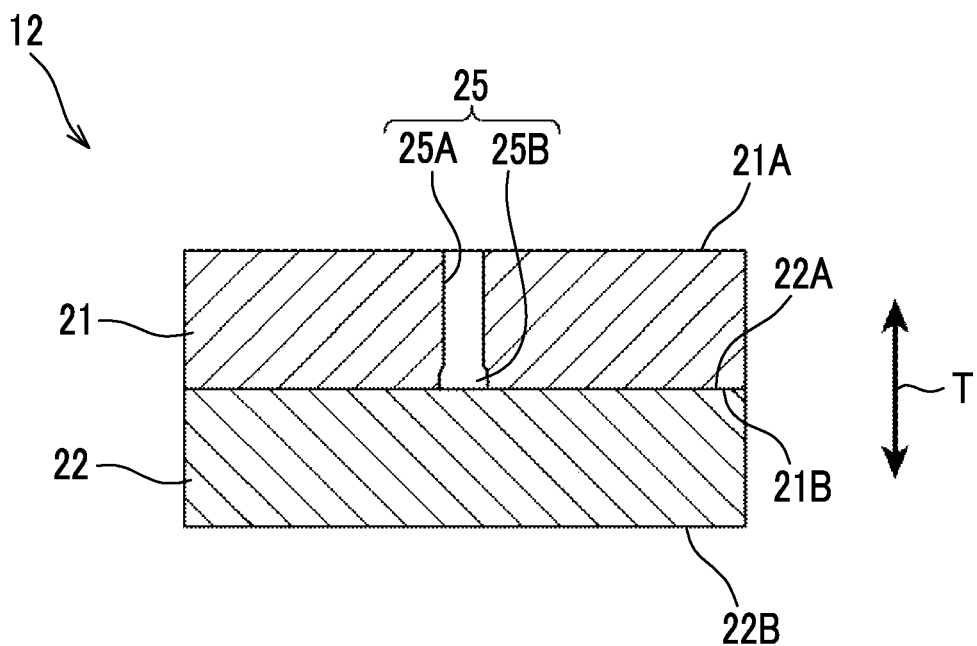
FIG. 5 is a cross-sectional view taken along line 5-5 in FIG. 3.

The inflow path 25 is a passage for allowing a fluid to flow into the mixing chamber 31. The inflow path 25 has a first path 25A and a second path 25B, as shown in FIGS. 2 and 5. The first path 25A is configured by a hole (specifically, a circular hole) formed along the thickness direction (T direction in FIG. 5) of the first substrate 21. FIG. 5 is a cross-sectional view taken along line 5-5 in FIG. 3.

The second path 25B is formed on the lower surface 21B of the first substrate 21 as described below. That is, a groove portion is formed in the lower surface 21B of the first substrate 21 along an orthogonal direction (direction of an arrow A), and an opening on a lower side (second substrate 22 side) of the groove portion is closed by the upper surface 22A of the second substrate 22, whereby the second path 25B is formed. As shown in FIG. 5, the second path 25B is formed, for example, in a semi-circular cross section.

One end (upper end) of the first path 25A opens at the upper surface 21A of the first substrate 21. The other end (lower end) of the first path 25A communicates with one end of the second path 25B. The other end of the second path 25B communicates with the mixing chamber 31. As a result, a fluid flows into the mixing chamber 31 through the inflow path 25, and the fluid is stored in the mixing chamber 31.

In the present embodiment, four flow paths are provided in the chip 12 as the plurality of flow paths 40. Specifically, as the plurality of flow paths 40, flow paths 41, 42, 43, and 44 (hereinafter, this may be referred to as flow paths 41 to 44) are provided in the chip 12. The flow path 41 is an example of a flow path that allows a communication between the first chamber and the second chamber.

Figure 6:
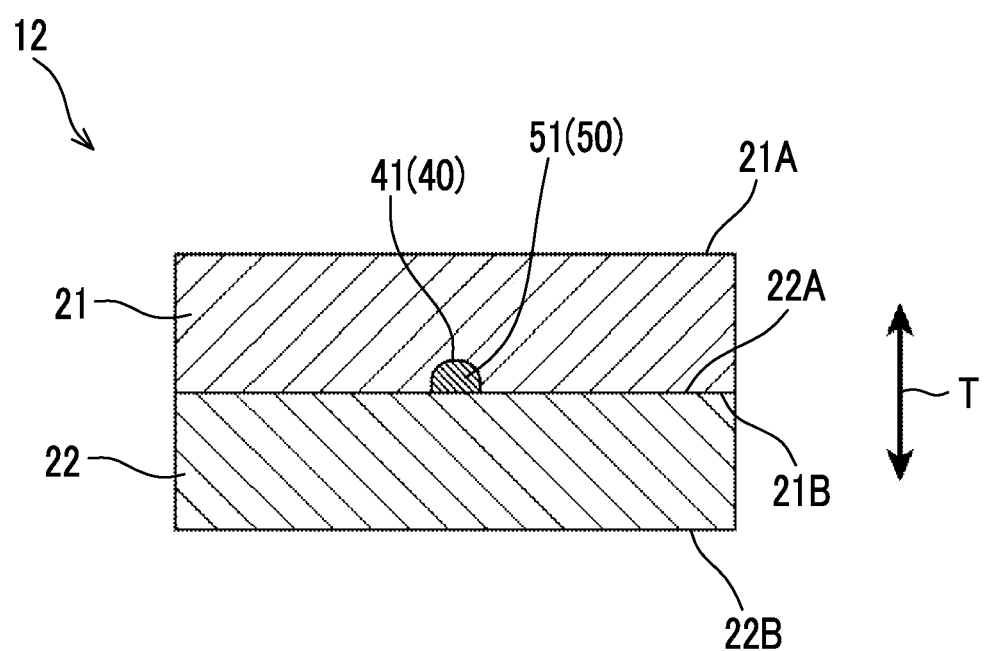
FIG. 6 is a cross-sectional view taken along line 6-6 in FIG. 3.

As shown in FIGS. 2 and 6, the flow paths 41 to 44 are formed on the lower surface 21B of the first substrate 21, respectively, as follows. That is, a groove portion is formed in the lower surface 21B of the first substrate 21 along an orthogonal direction (direction of an arrow A), and an opening on a lower side (second substrate 22 side) of the groove portion is closed by the upper surface 22A of the second substrate 22, whereby each of the flow paths 41 to 44 is formed. As shown in FIG. 6, each of the flow paths 41 to 44 is formed, for example, in a semi-circular cross section. FIG. 6 is a cross-sectional view taken along line 6-6 in FIG. 3.

The flow path 41 allows a communication between the mixing chamber 31 and the mixing chamber 32. Further, the flow path 42 allows a communication between the mixing chamber 32 and the mixing chamber 33. The flow path 43 allows a communication between the mixing chamber 33 and the mixing chamber 34.

One end of the flow path 44 communicates with the mixing chamber 34 on a side (right side in FIGS. 1 and 3) of the mixing chamber 34 opposite to the flow path 43 side (left side in FIGS. 1 and 3). The other end of the flow path 44 opens at a side surface (right side surface in FIG. 1) of the first substrate 21. As a result, a fluid stored in the mixing chamber 34 can flow out to an outside (right side in FIGS. 1 and 3) of the chip 12 through the flow path 44. In this way, the flow path 44 functions as a passage for allowing a fluid to flow out of the mixing chamber 34.

(Plurality of Valves 50)

As the plurality of valves 50 shown in FIG. 1 and the like, four valves of the same number as the flow paths 40 are provided in the chip 12. Specifically, as the plurality of valves 50, valves 51, 52, 53, and 54 (hereinafter, this may be referred to as valves 51 to 54) are provided in the chip 12. The valve 51 is an example of a valve which is provided in the flow path and capable of changing the flow path by change in shape by heating.

The valves 51 to 54 are provided in the flow paths 41 to 44, respectively. The valves 51 to 54 close the flow paths 41 to 44, respectively. As a result, a fluid cannot flow in each of the flow paths 41 to 44. Therefore, mixing targets preliminarily stored in the mixing chambers 31 to 34 do not flow out of the mixing chambers 31 to 34, and the mixing targets do not mix with each other.

A thermoplastic material is used for each of the valves 51 to 54, for example. That is, as each of the valves 51 to 54, for example, a material having a property of being softened by heating and deformed into another shape is used.

Examples of the thermoplastic material include general-purpose plastics (polyethylene (PE), polypropylene (PP), polyvinyl chloride (PVC), polyvinylidene chloride, polystyrene (PS), polyvinyl acetate (PVAc), polyurethane (PUR), polytetrafluoroethylene (PTFE), an ABS resin (acrylonitrile butadiene styrene resin), an AS resin, an acrylic resin (PMMA)), engineering plastics (polyamide (PA), nylon, polyacetal (POM), polycarbonate (PC), modified polyphenylene ether (m-PPE, modified PPE, PPO), polyester (PEs) including polyethylene terephthalate (PET), glass fiber-reinforced polyethylene terephthalate (GF-PET), and polybutylene terephthalate (PBT), cyclic polyolefin (COP), polyphenylene sulfide (PPS), polysulfone (PSF), polyethersulfone (PES), amorphous polyarylate (PAR), a liquid crystal polymer (LCP), polyetheretherketone (PEEK), thermoplastic polyimide (PI), and polyamide-imide (PAI)), wax, paraffin, soap, fat, and the like. These thermoplastic materials may be used alone or in combination of two or more.

Each of the valves 51 to 54 is made solid in an unheated state, that is, at a room temperature (ambient temperature at which the chip 12 is handled). That is, each of the valves 51 to 54 has a melting point higher than a room temperature.

Further, each of the valves 51 to 54 has a melting point less than a temperature at which a specimen contained in a fluid is thermally denatured. In a case where the specimen is a protein, the temperature for thermal denaturation is, for example, 70° C. Therefore, a thermoplastic material having a melting point of less than 70° C. is used as each of the valves 51 to 54. Examples of such a thermoplastic material include wax, paraffin, soap, fat, and the like.

Further, each of the valves 51 to 54 has a melting point higher than a temperature of a fluid stored in each of the mixing chambers 31 to 34. As a result, the valves 51 to 54 do not melt even though a fluid comes into contact with the valves 51 to 54.

Each of the valves 51 to 54 has a color material that absorbs light. As an example of the color material, a black color material is used. Then, the valves 51 to 54 are heated by absorbing light transmitted through the first substrate 21. In a case where the valves 51 to 54 are heated, shapes thereof are changed to open the flow paths 41 to 44, respectively.

The shape change in each of the valves 51 to 54 is a shape change in which a dimension of the first substrate 21 in the thickness direction (T direction in FIG. 1) is reduced. Specifically, the valves 51 to 54 melt and flow, for example, in the orthogonal direction (direction of an arrow A in FIG. 1) to be in a flat state.

The change in shape of each of the valves 51 to 54 is irreversible. That is, the valves 51 to 54 do not return to the original state (the state in which the flow paths 41 to 44 are closed). In other words, the valves 51 to 54 maintain the open state of the flow paths 41 to 44, respectively.

Then, the valves 51 to 54 open the flow paths 41 to 44, respectively, so that a fluid can flow in the flow paths 41 to 44.

Specifically, a fluid flowing into the mixing chamber 31 through the inflow path 25 can flow into the mixing chamber 32 through the flow path 41. The fluid flowing into the mixing chamber 32 can flow into the mixing chamber 33 through the flow path 42. The fluid flowing into the mixing chamber 33 can flow into the mixing chamber 34 through the flow path 43. The fluid flowing into the mixing chamber 34 can flow out to the outside (upper side) of the chip 12 through the flow path 44. A flow direction of the fluid in the chip 12 is the orthogonal direction (direction of an arrow A in FIG. 1).

(Irradiation Unit 60)

The irradiation unit 60 shown in FIG. 1 is an example of an irradiation unit that irradiates the valve with light. The irradiation unit 60 is also an example of a heater that heats the valve.

Specifically, as shown in FIG. 1, the irradiation unit 60 has a light source 62 and a lens 64 as a light condensing element. The light source 62 emits light toward the valve 51 (lower side in FIG. 1) from a side (upper side) of the first substrate 21 opposite to the second substrate 22 side (lower side). As the light source 62, a semiconductor light source, a discharge lamp, and a halogen lamp are used. Examples of the semiconductor light source include a light emitting diode (LED), a laser diode (LD), and the like.

The light source 62 emits infrared light as light, for example. Specifically, the light source 62 emits infrared light having a wavelength of, for example, 20 μm or less. Preferably, the light source 62 emits infrared light having a wavelength of 2 μm or less.

The lens 64 has a function of condensing light rays emitted from the light source 62 to the valve 51. A temperature of the valve 51 may be measured by a temperature sensor to control an output of the light source 62. In addition, the irradiation unit 60 is relatively movable in the orthogonal direction (direction of an arrow A in FIG. 1) with respect to the chip 12 at an irradiation position where each of the valves 51 to 54 can be irradiated with light. That is, the irradiation position of the irradiation unit 60 can be changed to an irradiation position where each of the valves 51 to 54 can be irradiated with light by relatively moving in the direction orthogonal (direction of an arrow A in FIG. 1) with respect to the chip 12.

(Moving Mechanism 70)

The moving mechanism 70 shown in FIG. 1 is an example of a moving mechanism for moving a fluid stored in the first chamber to the second chamber.

Specifically, the moving mechanism 70 is configured by a support body that supports the chip 12 so as to have a downward slope from the mixing chamber 31 toward the mixing chamber 34. Thus, the mixing chamber 32 (an example of the second chamber) is located lower than the mixing chamber 31 (an example of the first chamber), the mixing chamber 33 is located lower than the mixing chamber 32, and the mixing chamber 34 is located lower than the mixing chamber 33.

As a result, a fluid moves from the mixing chamber 31 to the mixing chamber 32 by gravity, moves from the mixing chamber 32 to the mixing chamber 33, and moves from the mixing chamber 33 to the mixing chamber 34. In this way, the moving mechanism 70 moves a fluid by using gravity acting on the fluid.

(Mixing Method)

Next, a mixing method of mixing a fluid with a mixing target using the mixing device 10 will be described.

The present mixing method includes an inflow step, a first opening step, a first moving step, a second opening step, a second moving step, a third opening step, a third moving step, a fourth opening step, and an outflow step. In the present mixing method, each step is executed in the order of an inflow step, a first opening step, a first moving step, a second opening step, a second moving step, a third opening step, a third moving step, a fourth opening step, and an outflow step. Hereinafter, each step will be described.

(Inflow Step)

In the inflow step, a fluid is allowed to flow into the mixing chamber 31 through the inflow path 25. As a result, the fluid is stored in the mixing chamber 31. The fluid stored in the mixing chamber 31 is mixed in the mixing chamber 31 with a mixing target preliminarily stored in the mixing chamber 31.

(First Opening Step)

The first opening step is an example of a first step of heating a valve provided in a flow path that allows a communication between a first chamber and a second chamber, and changing a shape of the valve to open the flow path. Specifically, in the first opening step, the irradiation unit 60 irradiates the valve 51 with light to heat the valve 51, changes a shape of the valve 51 to open the flow path 41.

(First Moving Step)

The first moving step is an example of a second step of moving the fluid stored in the first chamber to the second chamber in which a mixing target is stored. In the first moving step, the fluid stored in the mixing chamber 31 is moved to the mixing chamber 32 through the flow path 41 opened by the valve 51.

Specifically, in the first moving step, the flow path 41 is opened in the chip 12 supported so as to have a downward slope from the mixing chamber 31 toward the mixing chamber 34, so that the fluid is moved from the mixing chamber 31 to the mixing chamber 32 by gravity. As a result, the fluid is mixed with a mixing target stored in the mixing chamber 32 in the mixing chamber 32.

(Second Opening Step)

In the second opening step, the irradiation unit 60 irradiates the valve 52 with light to heat the valve 52, changes a shape of the valve 52 to open the flow path 42.

(Second Moving Step)

In the second moving step, the fluid stored in the mixing chamber 32 is moved to the mixing chamber 33 through the flow path 42 opened by the valve 52. Specifically, in the second moving step, the flow path 42 is opened in the chip 12 supported so as to have a downward slope from the mixing chamber 31 toward the mixing chamber 34, so that the fluid is moved from the mixing chamber 32 to the mixing chamber 33 by gravity. As a result, the fluid is mixed with a mixing target stored in the mixing chamber 33 in the mixing chamber 33.

(Third Opening Step)

In the third opening step, the irradiation unit 60 irradiates the valve 53 with light to heat the valve 53, changes a shape of the valve 53 to open the flow path 43.

(Third Moving Step)

In the third moving step, the fluid stored in the mixing chamber 33 is moved to the mixing chamber 34 through the flow path 43 opened by the valve 53. Specifically, in the third moving step, the flow path 43 is opened in the chip 12 supported so as to have a downward slope from the mixing chamber 31 toward the mixing chamber 34, so that the fluid is moved from the mixing chamber 33 to the mixing chamber 34 by gravity. As a result, the fluid is mixed with a mixing target stored in the mixing chamber 34 in the mixing chamber 34.

(Fourth Opening Step)

In the fourth opening step, the irradiation unit 60 irradiates the valve 54 with light to heat the valve 54, changes a shape of the valve 54 to open the flow path 44.

(Outflow Step)

In the outflow step, the fluid stored in the mixing chamber 34 is allowed to flow out of the chip 12 through the flow path 44 opened by the valve 54.

(Operation and Effect of Present Embodiment)

According to the present embodiment, in the above-described first opening step, the flow path 41 is opened by changing the shape of the valve 51 by heating. Then, in the above-described first moving step, the fluid stored in the mixing chamber 31 is moved to the mixing chamber 32 through the flow path 41 opened by the valve 51. As a result, the fluid can be mixed with the mixing target in the mixing chamber 32. Therefore, no mechanical operation is required for the valve 51. The mechanical operation means, for example, performing an operation such as pushing, pulling, or turning by applying an external force to the valve 51.

In the present embodiment, the valve 51 is heated by irradiating the valve 51 with light, and the shape of the valve 51 is changed to open the flow path 41. Therefore, the irradiation unit 60 can heat the valve 51 without being in contact with the chip 12. As a result, a foreign matter can be prevented from entering the fluid.

Further, in the present embodiment, since the valve 51 has a color material that absorbs light, the valve 51 can be heated in a short time after the start of irradiation with light. As a result, the flow path 41 can be opened in a short time after the start of irradiation with light.

According to the present embodiment, since the flow path 41 can be opened by softening the valve 51 to be in a flat state, the flow path 41 can be opened wider than in a case where the flow path 41 is opened by contracting the valve 51, for example.

Further, the valve 51 has a melting point less than a temperature at which a specimen contained in a fluid is thermally denatured. Therefore, the flow path 41 can be opened without thermally denaturing the specimen.

In the present embodiment, since the change in shape of the valve 51 is irreversible, the flow path 41 can be prevented from being inadvertently closed.

Modification Examples

In the present embodiment, a fluid is moved by gravity in each of the flow paths 41 to 44, but the present invention is not limited to this. For example, a magnetic force, an electrostatic attraction force, a pressure, and the like may be used to move a fluid. In addition, a plurality of combinations of gravity, a magnetic force, an electrostatic attraction force, a pressure, and the like may be used to move a fluid.

In the present embodiment, the flow path 41 is opened by softening the valve 51 to be in a flat state, but the present invention is not limited to this. For example, the flow path may be opened by contracting the valve. In this case, for example, a thermosetting material is used as the valve. Examples of the thermosetting material include a phenol resin (PF), an epoxy resin (EP), a melamine resin (MF), a urea resin (UF), an unsaturated polyester resin (UP), an alkyd resin, polyurethane (PUR), thermosetting polyimide (PI), and the like. These thermosetting materials may be used alone or in combination of two or more.

In the present embodiment, the valves 51 to 54 are heated by irradiating the valves 51 to 54 with light, and the shapes of the valves 51 to 54 are changed to open the flow paths 41 to 44. However, the present invention is not limited to this. For example, a heater that comes into contact with the chip 12 may be used to heat the valves 51 to 54.

In the present embodiment, each of the valves 51 to 54 has a color material that absorbs light, but the present invention is not limited to this. For example, a peripheral portion of each of the valves 51 to 54 may have a color material that absorbs light. Therefore, at least one of the valve or the peripheral portion of the valve may have a color material that absorbs light. The peripheral portion includes, for example, a contact portion of the first substrate 21 that comes into contact with each of the valves 51 to 54, or a contact portion of the second substrate 22 that comes into contact with each of the valves 51 to 54.

In the above description, the mixing chamber 31 is used as an example of the first chamber, the mixing chamber 32 is used as an example of the second chamber, the flow path 41 is used as an example of the flow path that allows the communication between the first chamber and the second chamber, and the valve 51 is used as an example of the valve capable of changing the flow path by change in shape by heating. However, the present invention is not limited to this. For example, the mixing chamber 32 may be understood as an example of the first chamber, the mixing chamber 33 may be understood as an example of the second chamber, the flow path 42 may be understood as an example of the flow path that allows the communication between the first chamber and the second chamber, and the valve 52 may be understood as an example of the valve capable of changing the flow path by change in shape by heating. In addition, the mixing chamber 33 may be understood as an example of the first chamber, the mixing chamber 34 may be understood as an example of the second chamber, the flow path 43 may be understood as an example of the flow path that allows the communication between the first chamber and the second chamber, and the valve 53 may be understood as an example of the valve capable of changing the flow path by change in shape by heating.

(Specific Usage Example of Mixing Device 10)

The mixing device 10 can be used as a processing device for polymerase chain reaction. In this case, for example, the mixing device 10 is configured as follows.

A surfactant having an action of dissolving a cell membrane is preliminarily stored in the mixing chamber 31. A cleaning liquid (for example, 70% ethanol) for cleaning deoxyribonucleic acid (DNA) is preliminarily stored in the mixing chamber 32 as a mixing target.

A reaction liquid containing a DNA polymerase and a primer is preliminarily stored in the mixing chamber 33 as a mixing target. A preparation liquid (for example, a buffer liquid) for preparing a sample is preliminarily stored in the mixing chamber 34 as a mixing target.

In a case where the mixing device 10 is used as a processing device for polymerase chain reaction, for example, polymerase chain reaction processing is performed by the following processing method.

(Inflow Step)

In the inflow step, a specimen liquid (an example of a fluid) containing cells as a specimen is allowed to flow into the mixing chamber 31 through the inflow path 25. As a result, the specimen liquid is stored in the mixing chamber 31. The specimen liquid stored in the mixing chamber 31 is mixed in the mixing chamber 31 with a surfactant preliminarily stored in the mixing chamber 31. As a result, DNA is released from the cells.

(First Opening Step)

In the first opening step, the irradiation unit 60 irradiates the valve 51 with light to heat the valve 51, changes the shape of the valve 51 to open the flow path 41.

(First Moving Step)

In the first moving step, the DNA released from the cells of the specimen liquid is moved to the mixing chamber 32 through the flow path 41 opened by the valve 51. That is, the DNA is separated from the specimen liquid into the mixing chamber 32.

Specifically, for example, separation of the DNA is performed using a separation method of separating the DNA by adsorbing the DNA on a magnetic particle and moving the magnetic particle to the mixing chamber 32 by a magnetic force, a separation method of separating the DNA by a filter, or the like. The separation methods may be used alone or in combination.

The DNA separated into the mixing chamber 32 is mixed with the cleaning liquid stored in the mixing chamber 31. As a result, the DNA is cleaned.

(Second Opening Step)

In the second opening step, the irradiation unit 60 irradiates the valve 52 with light to heat the valve 52, changes a shape of the valve 52 to open the flow path 42.

(Second Moving Step)

In the second moving step, the DNA mixed with the cleaning liquid is moved to the mixing chamber 33 through the flow path 42 opened by the valve 52. That is, the DNA is separated from the cleaning liquid into the mixing chamber 33. Specifically, DNA is separated using the above-described separation method.

The DNA separated into the mixing chamber 33 is mixed with the reaction liquid stored in the mixing chamber 33. Then, the polymerase chain reaction is performed by repeating heating and cooling of the DNA mixed with the reaction liquid.

(Third Opening Step)

In the third opening step, the irradiation unit 60 irradiates the valve 53 with light to heat the valve 53, changes a shape of the valve 53 to open the flow path 43.

(Third Moving Step)

In the third moving step, the reaction liquid with which the DNA is mixed is moved to the mixing chamber 34 through the flow path 43 opened by the valve 53. As a result, the reaction liquid is mixed with the preparation liquid, and the sample is prepared.

(Fourth Opening Step)

In the fourth opening step, the irradiation unit 60 irradiates the valve 54 with light to heat the valve 54, changes a shape of the valve 54 to open the flow path 44.

(Outflow Step)

In the outflow step, the sample (reaction liquid with which the DNA is mixed) stored in the mixing chamber 34 is allowed to flow out of the chip 12 through the flow path 44 opened by the valve 54. In addition, analysis (for example, chromatography) is performed on the sample that has flowed out.

The present invention is not limited to the embodiments described above, and various modifications, changes, and improvements can be made without departing from the spirit of the present invention. For example, a plurality of the above-described modification examples may be combined as appropriate.

The disclosure of JP2018-066536 filed on Mar. 30, 2018 is incorporated herein by reference in its entirety. All documents, patent applications, and technical standards described in this specification are herein incorporated by reference to the same extent that each individual document, patent application, or technical standard was specifically and individually indicated to be incorporated by reference.

A chip according to a first aspect comprises a first storage part that stores a fluid, a second storage part that stores a mixing target which is to be mixed with the fluid, a flow path that allows a communication between the first storage part and the second storage part, and a valve that is provided in the flow path and capable of changing the flow path by change in shape by heating.

According to the chip of the first aspect, the fluid is stored in the first storage part. The mixing target which is to be mixed with the fluid is stored in the second storage part. The valve is provided in the flow path that allows the communication between the first storage part and the second storage part. The shape of the valve is changed by heating to open the flow path. Accordingly, it is possible to mix the fluid with the mixing target by opening the closed flow path by heating.

The chip according to a second aspect may further comprise a forming member in which the flow path is formed and which is capable of transmitting light, and the valve may be heated by absorbing light transmitted through the forming member.

According to the chip of the second aspect, the flow path can be opened by irradiating the valve with light through the forming member.

In the chip according to a third aspect, at least one of the valve or a peripheral portion of the valve may have a color material that absorbs light.

According to the chip of the third aspect, since at least one of the valve or the peripheral portion of the valve absorbs light by the color material, the valve can be heated in a short time after the start of irradiation with light. As a result, the flow path can be opened in a short time after the start of irradiation with light.

In the chip according to a fourth aspect, the valve may be a thermoplastic material.

According to the chip of the fourth aspect, since the flow path can be opened by softening the valve to be in a flat state, the flow path can be opened wider than in a case where the flow path is opened by contracting the valve, for example.

In the chip according to a fifth aspect, the valve may have a melting point less than a temperature at which a specimen contained in the fluid is thermally denatured.

According to the chip of the fifth aspect, the flow path can be opened without thermally denaturing the specimen.

In the chip according to a sixth aspect, the change in shape of the valve may be irreversible.

According to the chip of the sixth aspect, the flow path can be prevented from being inadvertently closed.

A mixing device according to a seventh aspect comprises: the chip according to any one of the first to sixth aspects; and a heating unit that heats the valve.

According to the mixing device of the seventh aspect, the heating unit heats the valve to open the flow path, so that the fluid can be mixed with the mixing target.

In the mixing device according to an eighth aspect, the heating unit may be an irradiation unit that irradiates the valve with light.

According to the mixing device of the eighth aspect, the heating unit can heat the valve without being in contact with the chip.

The mixing device according to a ninth aspect may further comprise: a moving mechanism for moving the fluid stored in the first storage part to the second storage part.

According to the mixing device of the ninth aspect, the fluid can be mixed with the mixing target in the second storage part.

A mixing method according to a tenth aspect comprises: a first step of heating a valve provided in a flow path that allows a communication between a first storage part and a second storage part, and changing a shape of the valve to open the flow path; and a second step of moving the fluid stored in the first storage part to the second storage part in which a mixing target is stored.

According to the mixing method of the tenth aspect, the flow path can be opened by heating the valve, so that the fluid can be mixed with the mixing target in the second storage part.

In the mixing method according to an eleventh aspect, in the first step, the valve may be heated by irradiating the valve with light, and the shape of the valve may be changed to open the flow path.

According to the mixing method of the eleventh aspect, a heating unit can heat the valve without being in contact with the chip.

According to the technology of the present disclosure, it is possible to mix a fluid with a mixing target by opening the closed flow path by heating.

What is claimed is:

1. A chip comprising:
   a first chamber that stores a fluid;
   a second chamber that stores a mixing target which is to be mixed with the fluid;
   a first flow path that allows a communication between the first chamber and the second chamber;
   a first valve that is provided in the first flow path and capable of changing the first flow path by change in shape by heating;
   a second flow path that allows a communication between the second chamber and an outside of the chip; and
   a second valve that is provided in the second flow path and capable of changing the second flow path by change in shape by heating.

2. The chip according to claim 1, further comprising:
   a light permeable member in which the first flow path and the second flow path are formed and which is capable of transmitting light,
   wherein the first valve and the second valve are heated by absorbing light transmitted through the light permeable member.

3. The chip according to claim 2,
   wherein at least one of the first valve or a peripheral portion of the first valve has a color material that absorbs light, and at least one of the second valve or a peripheral portion of the second valve has a color material that absorbs lioht.

4. The chip according to claim 1,
   wherein the first valve and the second valve are a thermoplastic material.

5. The chip according to claim 2,
   wherein the first valve and the second valve are a thermoplastic material.

6. The chip according to claim 3,
   wherein the first valve and the second valve are a thermoplastic material.

7. The chip according to claim 4,
   wherein the first valve and the second valve have a melting; point less than a temperature at which a specimen contained in the fluid is thermally denatured.

8. The chip according to claim 5,
   wherein the first valve and the second valve have a melting point less than a temperature at which a specimen contained in the fluid is thermally denatured.

9. The chip according to claim 6,
   wherein the first valve and the second valve have a melting point less than a temperature at which a specimen contained in the fluid is thermally denatured.

10. The chip according to claim 1,
    wherein the change in shape of the first valve and the second valve is irreversible.

11. The chip according to claim 2,
    wherein the change in shape of the first valve and the second valve is irreversible.

12. The chip according to claim 3, wherein the change in shape of the first valve and the second valve is irreversible.

13. A mixing device comprising:
    the chip according to claim 1; and
    a heater that heats the valve.

14. The mixing device according to claim 13,
    wherein the heater irradiates the first valve and the second valve with light to heat the first valve and the second valve.

15. The mixing device according to claim 14, further comprising:
    a moving mechanism for moving the fluid stored in the first chamber to the second chamber.

16. A mixing method comprising:
    providing a chip comprising a first chamber and a second chamber;
    a first step of heating a first valve provided in a first flow path that allows a communication between a the first chamber and a the second chamber, and changing a shape of the first valve by heating to open the first flow path;

a second step of moving the fluid stored in the first chamber to the second chamber in which a mixing target is stored;

a third step of heating a second valve provided in a second flow path that allows a communication between the second chamber and an outside of the chip, and changing a shape of the second valve by heating to open the second flow path; and a fourth step of moving the fluid mixed with the mixing target from the second chamber to the outside of the chip.

17. The mixing method according to claim 16, wherein, in the first step, an irradiation unit irradiates the first valve with light to heat the first valve, and changes a shape of the first valve to open the first flow path, and in the third step, the irradiation unit irradiates the second valve with light to heat the second valve, and changes a shape of the second valve to open the second flow path.

\* \* \* \* \*